United States Patent [19]

O'Neil

[11] 4,234,223
[45] Nov. 18, 1980

[54] DRIVE MECHANISM FOR A PICK-AND-PLACE UNIT

[75] Inventor: James P. O'Neil, Swansea, Mass.

[73] Assignee: Automation Designs, Inc., Bristol, R.I.

[21] Appl. No.: 34,940

[22] Filed: Apr. 30, 1979

[51] Int. Cl.³ .............................................. B66C 1/42
[52] U.S. Cl. ..................................... 294/88; 294/116
[58] Field of Search ................ 294/88, 100, 106, 115, 294/116, 118; 74/99 R

[56] References Cited

U.S. PATENT DOCUMENTS

| 2,174,254 | 9/1939 | Black | 294/118 X |
| 2,335,214 | 11/1943 | McCartney | 294/116 |
| 2,725,154 | 11/1955 | Hendricks | 294/88 X |
| 2,853,905 | 9/1958 | Reisacher et al. | 294/88 X |
| 2,945,674 | 7/1960 | Hursh | 294/116 X |
| 3,240,360 | 3/1966 | Richards | 294/116 X |
| 3,318,630 | 5/1967 | Bryant | 294/116 X |
| 3,386,297 | 6/1968 | Willis | 74/99 |

Primary Examiner—Johnny D. Cherry
Attorney, Agent, or Firm—Robert J. Doherty

[57] ABSTRACT

An improved driving mechanism particularly adapted for use with pick-and-place units wherein a pair of jaws are pivotally supported from a housing and movable towards and away from each other. In this manner objects may be grasped by the jaws or extension thereof and moved from one place to another and then released by reason of the aforementioned relative jaw movement. The jaws cooperatively form a socket in which a generally cylindrical bushing is mounted at opposite ends thereof in a drive member which in turn is adapted to reciprocate back and forth with respect to the housing so as to open and close the jaws. One of the jaws at the upper head portion thereof includes a laterally movable pin which acts to limit the relative movement of the jaws towards and away from each other.

7 Claims, 3 Drawing Figures

DRIVE MECHANISM FOR A PICK-AND-PLACE UNIT

BACKGROUND AND SUMMARY OF THE INVENTION

This invention generally relates to a drive mechanism for actuating a pair of pivotally mounted jaws and is particularly adapted for use with those automatic handling devices known as pick-and-place units.

Devices of this general type are known and include that disclosed in U.S. Pat. No. 3,386,297 issued June 4, 1978. In the mechanism disclosed therein, a pair of levers or jaws are pivotally attached to a housing and driven between open and closed positions thereof by means of a reciprocal center drive member mounted in the housing and positioned between the levers. Line contact is provided between the drive member and the levers by means of the coaction of a disc 58 with knife edge portions 60 and 62. In addition stop means in the form of a threaded pin mounted in each of the jaws and engageable with the housing are included so as to selectively limit the extent of pivotal movement between the levers. The citation and discussion of the above patent constitutes applicant's Prior Art Statement. Although operable for the intended purposes, such above referred structure is overly complex and accordingly is expensive to produce. In addition, lower jaw portions of many presently utilized pick-and-place units are adapted for mounting of jaw extensions thereon and when so utilized such extensions may interfere with the adjustment of the stop means and accordingly necessitate their removal in order to accomplish adjustment of the jaws.

It is accordingly an object of the present invention to provide a more direct and less complex drive mechanism adapted for use in pick-and-place units as above described and which is less costly to produce than presently available commercial units.

A still further object of the present invention is the provision of a drive mechanism of the above indicated nature including stop means capable of trouble-free operation and which can additionally be adjusted in situ without the necessity of removing component parts of such pick-and-place units.

These and other objects of the present invention are accomplished by a device for driving a pair of jaws which are in turn pivotally supported from a housing towards and away from each other. Such jaws include inner respectively opposed surfaces each having an arcuate recess formed therein so as to cooperatively form a drive socket in which a generally cylindrical bushing is laterally disposed and in slidable face-to-face contact therewith. The terminal segments of a bifurcated drive member serve to laterally support the bushing. When the drive member is vertically reciprocated, it forces the jaws to pivotally move towards and away from each other in the intended manner. A threadably adjusted pin is mounted within a threaded, laterally extending bore provided in one of the jaws at the upper head portion thereof such that the pin may extend in between opposed upper face surfaces of the jaws and thus limit their movement towards and away from each other.

Other objects, features and advantages of the invention shall become apparent as the description thereof proceeds when considered in connection with the accompanying illustrative drawing.

DESCRIPTION OF THE DRAWING

In the drawing which illustrate the best mode presently contemplated for carrying out the present invention.

DESCRIPTION OF THE INVENTION

Figure 1:
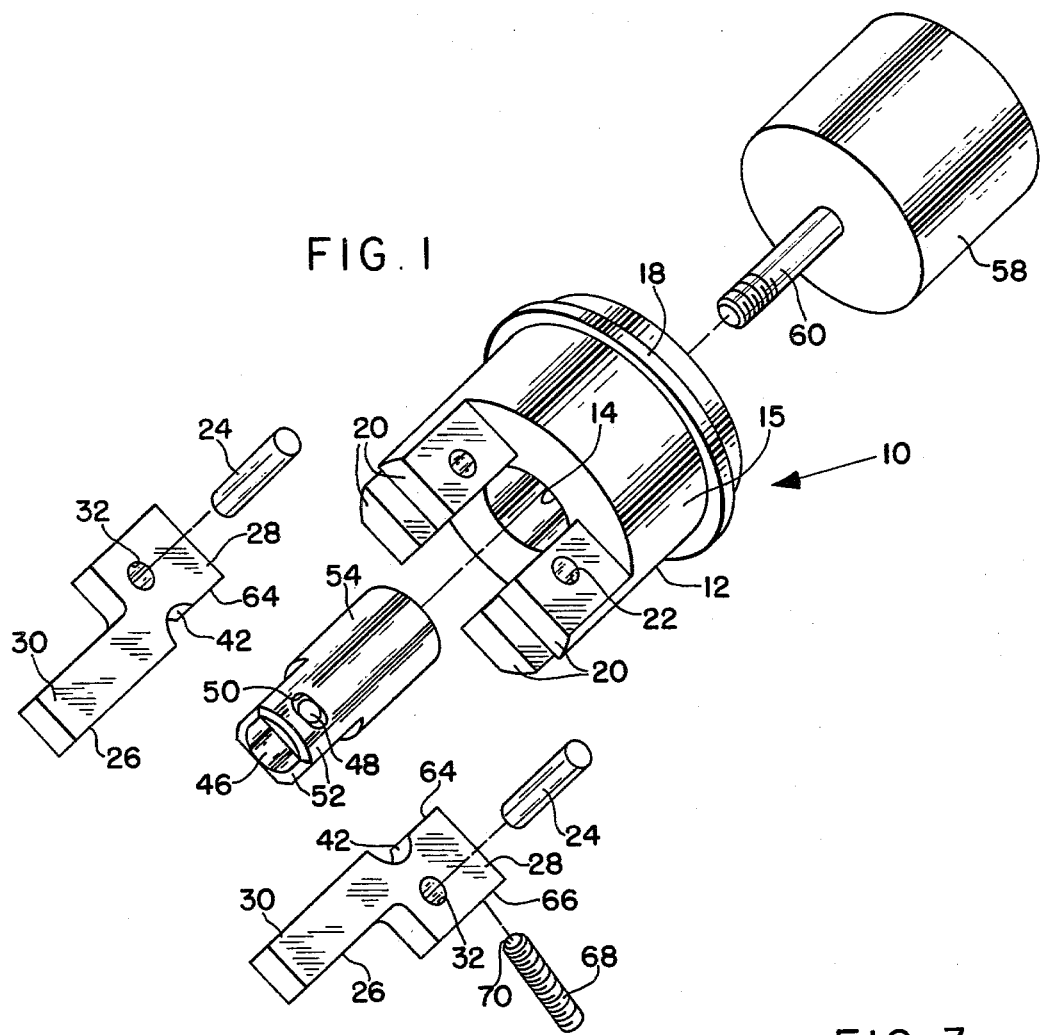
FIG. 1 is an exploded perspective view showing various component parts of the device of the present invention.

Turning now to the drawing and particularly FIG. 1 thereof, the drive mechanism 10 of the present invention is shown. In that regard, such is adapted for use with a pick-and-place unit such as that shown in U.S. Pat. No. 4,095,699 issued June 20, 1978, that is, as the parts handling mechanism 38 shown in such patent.

Device 10 includes a housing 12 of generally cylindrical configuration and including a bore 14 vertically extending therethrough. The outer surface 15 of the housing 12 includes an inwardly extending groove 16 in which snap ring 18 is adapted to fit such that it may in turn be utilized to mount the device 10 to the frame or other component of a pick-and-place machine. The bottom of the housing 12 includes a pair of downwardly extending spaced flanges or tongues 20 to form opposed pairs thereof on either side of the housing. Each tongue 20 includes a bore 22 in turn laterally aligned with the other of its pair and each adapted to receive a pivot pin 24.

A pair of jaws 26, each having an upper head portion 28 and a leg portion 30 downwardly extending therefrom, are adapted to be disposed within the space between the opposed tongues 20. In this regard a bore 32 is provided in the head 28 of each of the jaws 26 so as to receive the pivot pins 24 and in this manner the jaws 26 are supported from the housing for relative pivotal movement with respect thereto and such that they may be moved toward and away from each other. In this regard, objects may be placed between the legs 26 and as the legs move toward each other such objects may be grasped by the inner jaw surfaces and moved from one place to the other as previously explained. Although objects may be grasped by the legs themselves, it is more common to attach leg extensions 34 thereto as by means of cooperatively aligned threaded bores 36 formed in the legs 26 into which threaded bolts 38 may be engaged as through similarly cooperatively aligned bores 40 provided in the leg extensions 34. Other conventional means may be utilized to secure the leg extensions 34 to the legs 26; such attachment mechanism in no way forming a part of this invention. However, it should be brought out that the use of leg extensions 34 often would normally interfere with or prevent the adjustment of the jaws 26 of presently known commercially available stop mechanisms such as those referred to in applicant's Prior Art Statement.

The jaws 26 further include an inwardly-directed arcuately shaped recess 42 disposed on the inner surface of the jaws 26 and at a point downwardly spaced from the upper terminus of the head 28 thereof. The recesses 42 are disposed in opposition to each other and cooperatively form a socket 44 in turn adapted to receive a generally cylindrical, laterally extending, smooth surface bushing 46. Each end of the bushing 46 terminates in a reduced dimension support extension 48 adapted to be received within a laterally elongated slot 50 provided in the terminal end segments 52 of a bifurcated drive member 54. Accordingly, the terminal segments 52 are adapted for disposition on opposite sides of generally flat side surfaces of the jaws 26 and in such a manner so as to support the bushing 46 therebetween and at the same time not itself extending between the jaws 26. In this manner, a relatively open space 56 is formed between the inner surface of the jaw heads 28 at a location above the bushing 46 for a purpose which will hereinafter be more apparent.

The upper end of the housing 12 supports a conventional air cylinder 58 which may be attached thereto by screws (not shown) and includes a drive piston 60 downwardly extending therefrom. The piston vertically reciprocates and is in turn adapted for disposition within the housing bore 14. The piston is also attached to the drive member 54 by conventional means such as threaded engagement. Accordingly, when the device 10 of the present invention is assembled, it may be apparent that the bushing 46 is free to slide back and forth within the confines of the slots 50 such that, it is in each case centered between the opposed jaw recesses 42 and the socket 44 formed thereby. Thus as the piston is reciprocated, the bushing 46 acts against the arcuate surfaces of the recesses 42 so as to move the individual jaws towards and away from each other in the intended manner.

Figure 2:
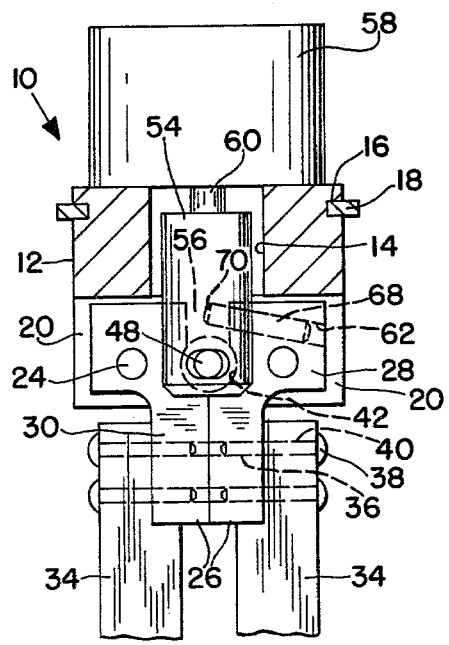
FIG. 2 is a sectional elevational view thereof showing the jaws thereof in their closed position.
Figure 3:
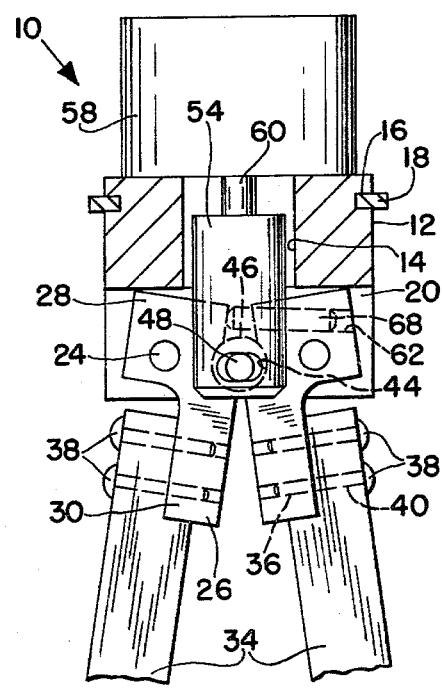
FIG. 3 is a view similar to FIG. 2 but showing the jaws in their open position.

One of the jaw heads 28 is provided with a laterally extending threaded bore 62 which in turn passes entirely through such head and terminates at the inner face 64 thereof above the recess 42 at one side and on the outer face 66 thereof at the other side. A threaded adjustment pin 68 is adapted for receipt in the threaded bore 62, such pin 68 having that end thereof proximal the outer face 66 provided with a slot for receiving a screwdriver or other conventional means for rotating the pin 68 within the bore 62. It may thus be apparent that the opposite end 70 of the pin is adapted to extend into the space 56 in such a manner so as to engage the inner face 64 of the opposed jaw head 28 and in this manner provide an adjustment or stop means for limiting the relative movement of the jaws 26. Normally, the jaws are formed from hardened steel and thus the adjusting pin engages the hardened face 64 of the other jaw head rather than against the normally unhardened housing as in prior art devices. This provides for better wear resistance as well as providing an unyielding contact surface so that intermediate adjustments caused by a pin digging into its stop surface is prevented. Also with the present device, the jaws are adjusted for side to side movement directly, that is, the stop means engages one of the jaws rather than an intermediate member. In that regard the full movement of the jaws 26 is shown in the transition between FIGS. 2 and 3 wherein FIG. 2 depicts the jaws 26 in their closed position as when the legs 30 thereof contact each other and FIG. 3 shows the legs 30 in their most open position, such movement limited by the contact of the stop means pin 68 with the inner face of the opposed jaw head 28. Adjustment of the stop means may also be made during operation of the pick-and-place unit on which the drive mechanism 10 of the present invention is adapted for use without necessity of disassembling parts thereof. In this regard the pin 68 can be adjusted from the outer side surface of the jaw head 28 in which it is mounted and thus does not require that the leg extensions 34 be removed in order to facilitate access with a screwdriver, Allen head wrench and the like. The side to side lateral positioning of the bore 62 further facilitates adjustment ease.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for driving a pair of jaws pivotally supported from a housing towards and away from each other, said jaws each including an upwardly oriented head from which a leg downwardly depends, said heads and said legs having inner respectively opposed surfaces, an arcuate recess formed in each such inner opposed head surface said recesses cooperatively forming a drive socket, a generally cylindrical bushing laterally disposed between said jaws and supported in said socket and disposed in slidable face to face contact with the opposed surfaces of said recesses, said bushing including terminal ends laterally extending past the opposite sides of said jaws and drive means connected to said bushing ends for reciprocating said bushing up and down with respect to said housing so as to force said jaws to pivotally move towards and away from each other, said drive means including a drive member having segments disposed on either side of said jaws and adapted to receive said bushing ends therein, said housing including a generally centrally disposed vertically oriented bore, said drive member passing through said bore and adapted for reciprocal movement relative thereto, said recesses downwardly spaced from the upper terminus of said head so as to define opposed upper head inner surfaces and stop means adapted to contact one of said upper head inner surfaces so as to directly limit the extent of pivotal movement of said jaws relative to each other.

2. The device of claim 1, said bushing slidably mounted in said drive means such that said bushing may freely move back and forth between said jaws for centered disposition in said socket.

3. The device of claim 2, said drive member terminating in a bifurcated clevis having terminal segments, said clevis terminal segments each including a laterally extending slot, said bushing ends received in said slots such that said bushing may freely move back and forth between said jaws for centered disposition in said socket.

4. The device of claim 1, including an air cylinder detachably mounted on top of said housing, said cylinder having a downwardly directed piston, said piston in turn detachably connected to said drive member.

5. The device of claim 1, said stop means including a pin mounted in one of said jaw heads and adjustably movable between said opposed upper head inner surfaces.

6. The device of claim 5, including a generally laterally oriented threaded bore disposed in one of said jaw heads and extending entirely through said head from the inner upper head surface thereto to an outer surface thereof, said pin also being threaded and having pin rotation means disposed at that pin end proximal said outer head surface.

7. The device of claim 6, said jaws each supported from said housing by means of a pivot pin, said bushing and said pivot pins disposed in generally lateral alignment and said adjusting pin bore disposed longitudinally above said bushing and said pivot pins.

* * * * *